(12) United States Patent
Zelesky et al.

(10) Patent No.: US 11,181,005 B2
(45) Date of Patent: Nov. 23, 2021

(54) GAS TURBINE ENGINE ASSEMBLY WITH MID-VANE OUTER PLATFORM GAP

(71) Applicant: United Technologies Corporation, Farmington, CT (US)

(72) Inventors: Mark F. Zelesky, Bolton, CT (US); Stephen K. Kramer, Cromwell, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 149 days.

(21) Appl. No.: 15/983,904

(22) Filed: May 18, 2018

(65) Prior Publication Data
US 2019/0353046 A1 Nov. 21, 2019

(51) Int. Cl.
F01D 11/08 (2006.01)
F01D 9/04 (2006.01)
F23R 3/00 (2006.01)
F01D 11/00 (2006.01)

(52) U.S. Cl.
CPC ............... F01D 11/08 (2013.01); F01D 9/04 (2013.01); F01D 11/005 (2013.01); F23R 3/002 (2013.01); F05D 2240/11 (2013.01); F05D 2240/35 (2013.01); F05D 2300/6033 (2013.01)

(58) Field of Classification Search
CPC .... F23R 3/002; F23R 3/50; F23R 3/60; F01D 11/00; F01D 11/005; F01D 11/08; F01D 9/023; F01D 9/04; F01D 9/02; F01D 9/047; F05D 2240/11; F05D 2240/12; F05D 2240/35; F05D 2240/55
See application file for complete search history.

(56) References Cited

U.S. PATENT DOCUMENTS

| 3,012,754 A | * | 12/1961 | Stalker | F01D 5/147 416/214 R |
| 3,985,465 A | * | 10/1976 | Sheldon | F01D 5/027 415/189 |
| 4,248,569 A | * | 2/1981 | Thebert | F01D 9/00 415/138 |
| 4,722,184 A | * | 2/1988 | Chaplin | F01D 9/042 60/226.1 |
| 4,752,184 A | * | 6/1988 | Liang | F01D 11/08 415/116 |

(Continued)

FOREIGN PATENT DOCUMENTS

WO 2007003629 A1 1/2007

OTHER PUBLICATIONS

European Search Report for European Application No. 19175482.9-1006, dated Jan. 7, 2020, 7 pages.

*Primary Examiner* — Alain Chau
(74) *Attorney, Agent, or Firm* — Cantor Colburn LLP

(57) ABSTRACT

An assembly for a gas turbine engine includes a vane assembly having an inner platform and an airfoil section extending from the inner platform. A first combustor panel extends at least partially along the vane from upstream of the vane, and a blade outer air seal extends at least partially along the vane from downstream of the vane. The first combustor panel and the blade outer air seal define a platform gap located between a leading edge of the airfoil section of the vane and a trailing edge of the airfoil section of the vane.

20 Claims, 5 Drawing Sheets

(56) References Cited

U.S. PATENT DOCUMENTS

| | | | | |
|---|---|---|---|---|
| 5,207,064 A * | 5/1993 | Ciokajlo | F23R 3/16 | 60/737 |
| 5,239,818 A * | 8/1993 | Stickles | F23R 3/04 | 60/804 |
| 5,398,496 A * | 3/1995 | Taylor | F23R 3/60 | 60/796 |
| 5,429,479 A * | 7/1995 | Cordier | F01D 9/042 | 415/209.3 |
| 5,492,445 A * | 2/1996 | Shaffer | F01D 9/042 | 415/136 |
| 5,630,700 A * | 5/1997 | Olsen | F01D 9/042 | 415/134 |
| 6,464,456 B2 * | 10/2002 | Darolia | F01D 5/3084 | 415/134 |
| 6,530,744 B2 | 3/2003 | Liotta et al. | | |
| 7,052,234 B2 * | 5/2006 | Wells | F16J 15/0812 | 415/137 |
| 7,237,387 B2 * | 7/2007 | Aumont | F01D 9/023 | 415/191 |
| 7,249,462 B2 * | 7/2007 | Aumont | F01D 9/023 | 60/796 |
| 8,141,371 B1 * | 3/2012 | Habarou | F23R 3/60 | 60/804 |
| 8,622,692 B1 * | 1/2014 | Liang | F01D 9/042 | 415/115 |
| 9,335,051 B2 * | 5/2016 | Jarmon | F23R 3/005 | |
| 9,822,649 B2 | 11/2017 | Davis, Jr. et al. | | |
| 10,233,764 B2 * | 3/2019 | Thomas | F01D 9/042 | |
| 10,253,641 B2 * | 4/2019 | Shapiro | F01D 9/023 | |
| 10,253,643 B2 * | 4/2019 | Kerns | F01D 11/04 | |
| 10,301,953 B2 * | 5/2019 | Correia | F01D 9/041 | |
| 10,370,990 B2 * | 8/2019 | Reynolds | F23R 3/10 | |
| 10,371,166 B2 * | 8/2019 | Urac | F04D 29/083 | |
| 10,378,373 B2 * | 8/2019 | Reynolds | F23R 3/002 | |
| 2005/0287002 A1 * | 12/2005 | Wells | F01D 9/042 | 415/209.4 |
| 2011/0142651 A1 | 6/2011 | Lhoest et al. | | |
| 2013/0014512 A1 * | 1/2013 | Jarmon | F01D 9/042 | 60/772 |
| 2014/0127008 A1 | 5/2014 | Davi et al. | | |
| 2015/0000268 A1 | 1/2015 | Clancy et al. | | |
| 2016/0047258 A1 * | 2/2016 | Hall | F01D 11/005 | 415/1 |
| 2017/0101880 A1 * | 4/2017 | Thomas | F01D 11/005 | |
| 2017/0370583 A1 | 12/2017 | Marusko et al. | | |
| 2018/0171809 A1 * | 6/2018 | Urac | F01D 11/005 | |
| 2018/0172026 A1 * | 6/2018 | Urac | F04D 29/644 | |
| 2018/0238181 A1 * | 8/2018 | Reynolds | F23R 3/002 | |
| 2018/0238183 A1 * | 8/2018 | Reynolds | F23R 3/10 | |
| 2018/0238185 A1 * | 8/2018 | Shapiro | F01D 9/023 | |
| 2018/0266264 A1 * | 9/2018 | Kerns | F01D 11/04 | |
| 2018/0298767 A1 * | 10/2018 | Correia | F01D 9/041 | |
| 2018/0298768 A1 * | 10/2018 | Correia | F01D 9/041 | |

* cited by examiner

GAS TURBINE ENGINE ASSEMBLY WITH MID-VANE OUTER PLATFORM GAP

BACKGROUND

Exemplary embodiments of the present disclosure pertain to the art of gas turbine engines. More particularly, the present disclosure relates to blade outer airseals of gas turbine engines.

Referring to FIGS. 4 and 5, a gas turbine engine includes a turbine section driven by hot combustion gases exiting a combustor 200. Efficiency of the gas turbine engine depends in part on the effectiveness of directing the hot combustion gases to and through the turbine section. A major source of efficiency loss in combustor and turbine sections is leakage between components. The leakage between the combustor 200 and first turbine vane 202 and more specifically between the combustor 200 and a vane platform 206, circumferentially between vane platforms 206, leakage between the vanes vane platforms 206 and blade outer air seals (BOAS) 204, and between adjacent BOAS 204 contributes to losses in both cycle efficiency & turbine efficiency.

In some gas turbine engines, dissimilar materials may be utilized for the combustor 200, vane platforms 206, BOAS 204, etc., resulting in different thermal expansion properties of the components. Such thermal expansion differences must be taken into account when configuring the interfaces between components, often resulting in larger design gaps between components of dissimilar materials than between equivalent parts having similar thermal expansion properties, thus increasing leakage between the components.

BRIEF DESCRIPTION

In one embodiment, an assembly for a gas turbine engine includes a vane assembly having an inner platform and an airfoil section extending from the inner platform. A first combustor panel extends at least partially along the vane from upstream of the vane, and a blade outer air seal extends at least partially along the vane from downstream of the vane. The first combustor panel and the blade outer air seal define a platform gap located between a leading edge of the airfoil section of the vane and a trailing edge of the airfoil section of the vane.

Additionally or alternatively, in this or other embodiments one or more combustor panel scallops are located in the first combustor panel to accommodate the vane leading edge of the airfoil section of the vane.

Additionally or alternatively, in this or other embodiments one or more blade outer airseal scallops are located in the blade outer airseal to accommodate the vane trailing edge of the airfoil section of the vane.

Additionally or alternatively, in this or other embodiments the first combustor panel is a full, unsegmented, closed ring.

Additionally or alternatively, in this or other embodiments the blade outer airseal is a full, unsegmented, closed ring.

Additionally or alternatively, in this or other embodiments the platform gap is located at mid-chord of the vane.

Additionally or alternatively, in this or other embodiments one or more of the first combustor panel and the blade outer airseal are formed from one of a ceramic matrix composite or monolithic composite material.

Additionally or alternatively, in this or other embodiments a second combustor panel extends radially inboard of the airfoil section and at least partially defines the inner platform.

Additionally or alternatively, in this or other embodiments the blade assembly is a first turbine blade assembly.

In another embodiment, a combustor panel of a gas turbine engine includes a main combustor panel portion located at a combustor of a gas turbine engine, and a combustor panel extension extending from the main combustor panel portion. The combustor panel extension includes a recess therein corresponding to at least a portion of a cross-sectional shape of a downstream airfoil section of a vane assembly.

Additionally or alternatively, in this or other embodiments the recess is shaped to accommodate a vane leading edge of the downstream airfoil section.

Additionally or alternatively, in this or other embodiments a combustor panel end is located at mid-chord of the downstream airfoil section.

Additionally or alternatively, in this or other embodiments the combustor panel is a full, unsegmented, closed ring.

Additionally or alternatively, in this or other embodiments the combustor panel is formed from one of a ceramic matrix composite or monolithic composite material.

In yet another embodiment, a gas turbine engine assembly includes a combustor liner, a blade outer air seal adjacent said combustor liner, and a vane assembly having at least one platform and an airfoil section extending from the platform. The airfoil section of the vane assembly extends through the combustor liner and the blade outer air seal.

Additionally or alternatively, in this or other embodiments one or more of the combustor liner or the blade outer airseal is a full, unsegmented, closed ring.

Additionally or alternatively, in this or other embodiments the combustor liner and the blade outer airseal define a platform gap therebetween.

Additionally or alternatively, in this or other embodiments the platform gap is located at mid-chord of the airfoil section.

Additionally or alternatively, in this or other embodiments the combustor liner defines at least a portion of an inner platform of the vane assembly.

Additionally or alternatively, in this or other embodiments the combustor liner and the blade outer airseal are formed from one of a ceramic matrix composite or monolithic composite material.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
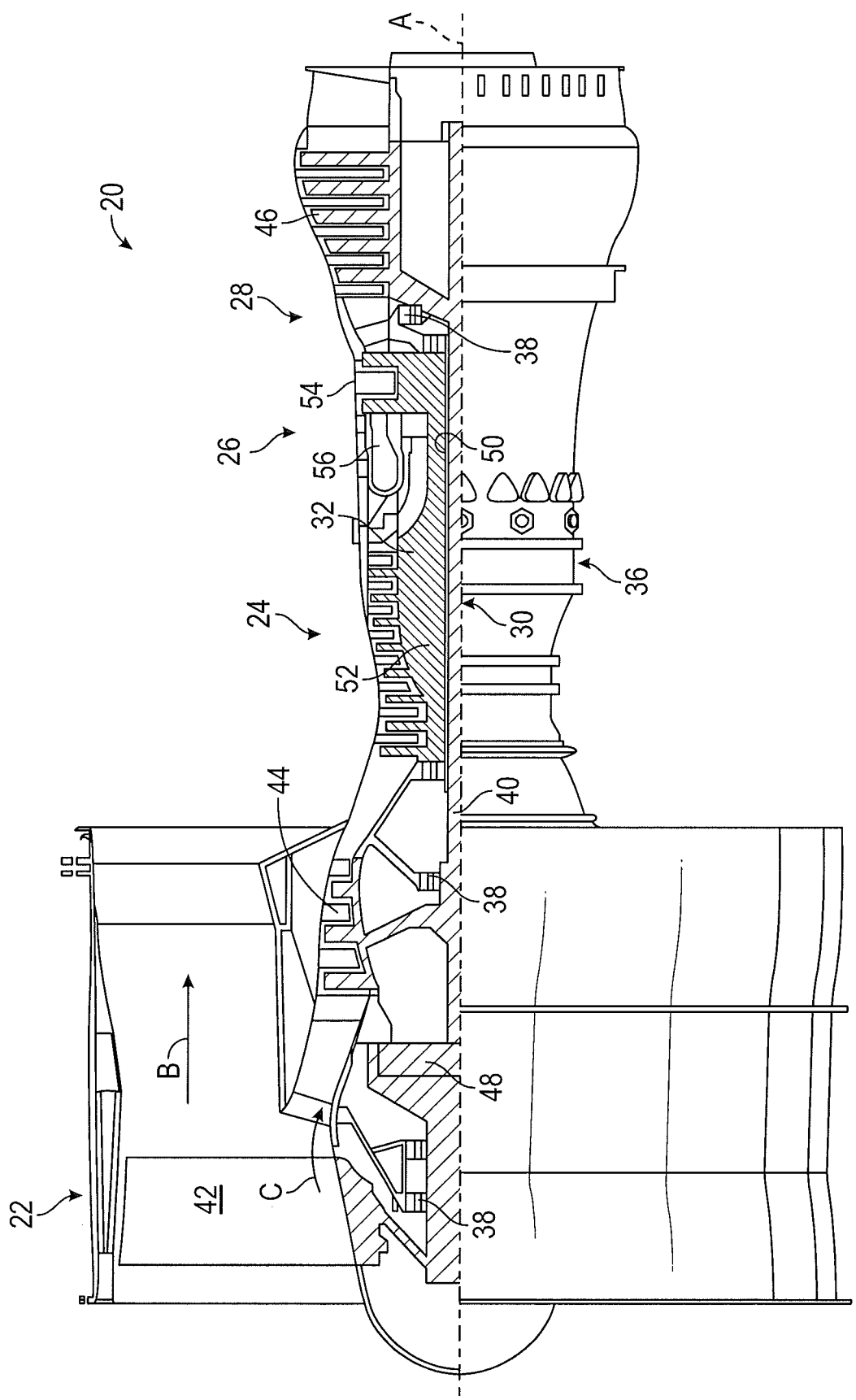
FIG. 1 is a partial cross-sectional view of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second (350.5 m/sec).

Figure 2:
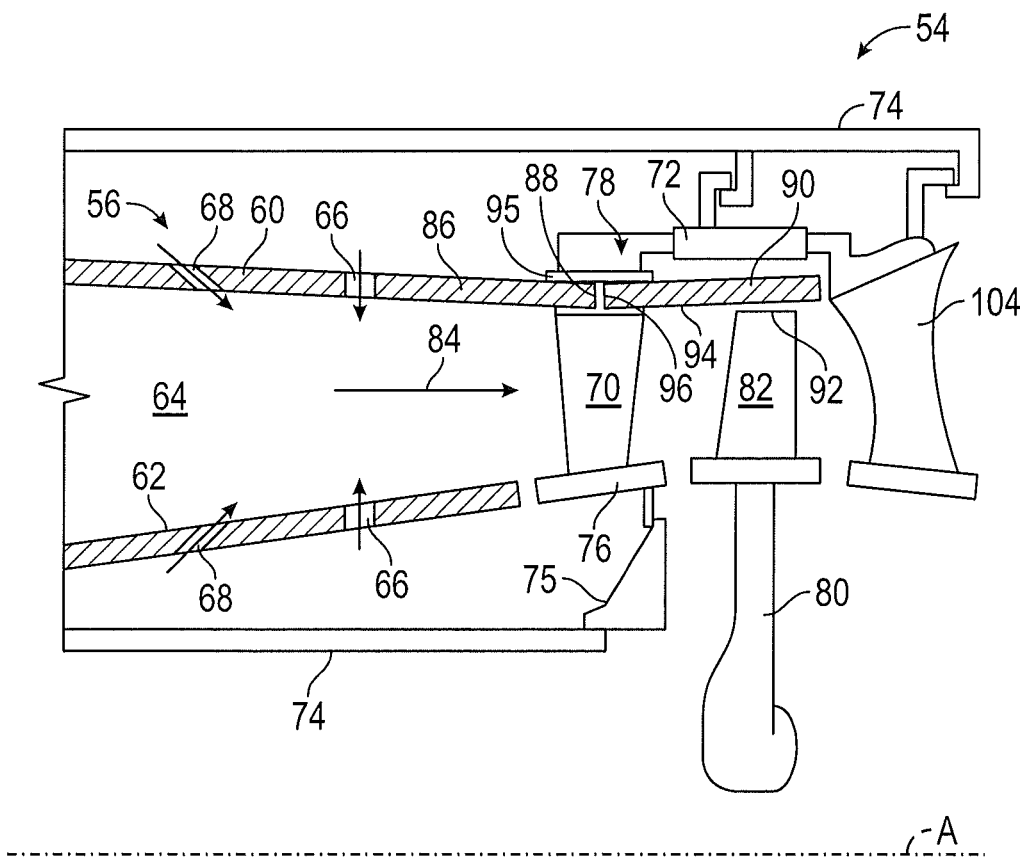
FIG. 2 is a partial cross-sectional view of a combustor and turbine portion of a gas turbine engine.

Referring now to FIG. 2, illustrated is a partial cross-sectional view of a combustor 56 and high pressure turbine 54 arrangement of the gas turbine engine 20. The combustor 56 includes a radially outer combustor liner 60 and a radially inner combustor liner 62, relative to the engine central longitudinal axis A. The combustor liners 60, 62, along with bulkhead combustor liners (not shown) define an annular combustion zone 64 of the combustor 56. The combustor liners 60, 62 may include airflow openings 66 to admit an airflow into the combustor liners 60, 62 to manage combustor 56 performance. Additionally, openings 68 may be provided to admit an airflow to provide cooling for the combustor liners 60, 62. In some embodiments, the combustor liners 60, 62 can include a combustor panel facing the combustion zone 64 and a shell on the cool side of the panel away from the combustion zone 64. In some arrangements, the panel and shell are made of a suitable metal. In other arrangements, the combustor liner or a component of the combustor liner (such as the panel) could be formed from a ceramic matrix composite (CMC) material.

Downstream of the combustor 56 is the high pressure turbine 54. The high pressure turbine 54 includes a first vane stage having a plurality of first vanes 70 arrayed circumferentially about the engine central longitudinal axis A. The first vanes 70 are secured to, for example, a vane support 72, which in turn may be secured to, for example, a diffuser case 74 of the gas turbine engine 20. The first vanes 70 extend from a vane inner platform 76 to a vane outer platform 78. In some embodiments, the vane inner platform 76 is secured to and/or is supported by the diffuser case 74. The connection may be direct, or as shown in FIG. 2, via a tangential on board injector (TOBI) 75. Further, the high pressure turbine 54 includes a turbine rotor 80, in some embodiments located downstream of the plurality of first vanes 70. The turbine rotor 80 includes a plurality of turbine blades 82 and is rotatably located in the gas turbine engine 20 such that a flow of hot combustion gases 84 from the combustor 56 drives rotation of the turbine rotor 80 about the engine central longitudinal axis A. In some embodiments, cooling of vane 70 is provided by one or more airflow openings (not shown) at, for example, the vane outer platform 78 and/or the vane inner platform 76.

The vane outer platform 78 is formed at least partially by a combustor liner extension 86 of the radially outer combustor liner 60. In some embodiments, the combustor liner extension 86 portion is integral to the radially outer combustor liner 60. The combustor liner extension 86 extends at least partially along the first vanes 70 to a liner end 88. A blade outer airseal (BOAS) 90 is located radially outboard of a turbine blade tip 92 of the turbine blades 82. The BOAS 90 provides a stationary wall outboard of the rotating turbine blades 82. Performance improves with reduction in the gap between the BOAS 90 and the turbine blades 82. CMC materials and monolithic composite materials, for example, utilized in the BOAS 90 have favorable thermal response to maintain a relatively small gap between the BOAS 90 and the turbine blades 82 during operation of the gas turbine engine 20.

The BOAS 90 includes a BOAS extension 94 that extends forward to the plurality of first vanes 70. In some embodiments, the BOAS extension 94 is formed from a CMC material, or alternatively from a monolithic composite material or the like. In some embodiments, a vane seal 95 is located radially outboard of the BOAS extension 94.

Figure 2A:
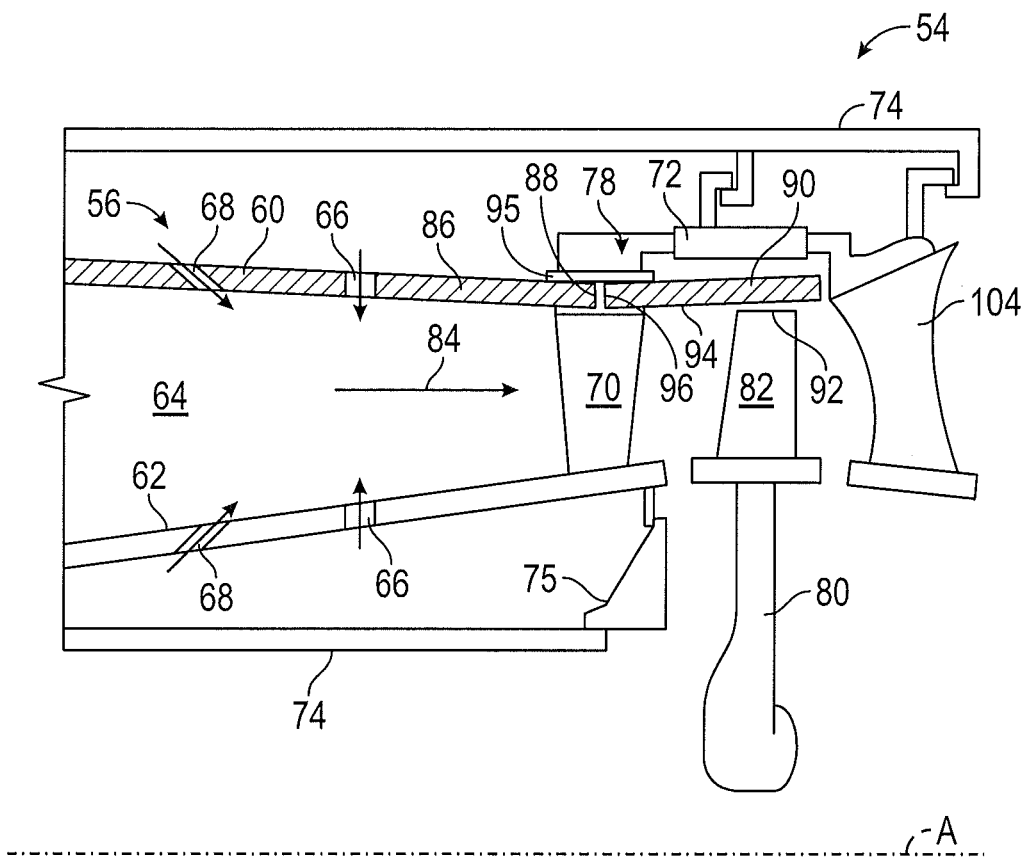
FIG. 2A is another partial cross-sectional view of a combustor and turbine portion of a gas turbine engine.

In another embodiment, illustrated in FIG. 2A, the first vanes 70 are a cantilevered configuration, with the vanes 70 not being fixed at a inboard portion thereof. In this embodiment, the combustor panel 62 extends aftward under the first vanes 70 toward the turbine rotor 80. The combustor panel 62 may be supported directly by the diffuser case 74, or via the TOBI 75.

Figure 3:
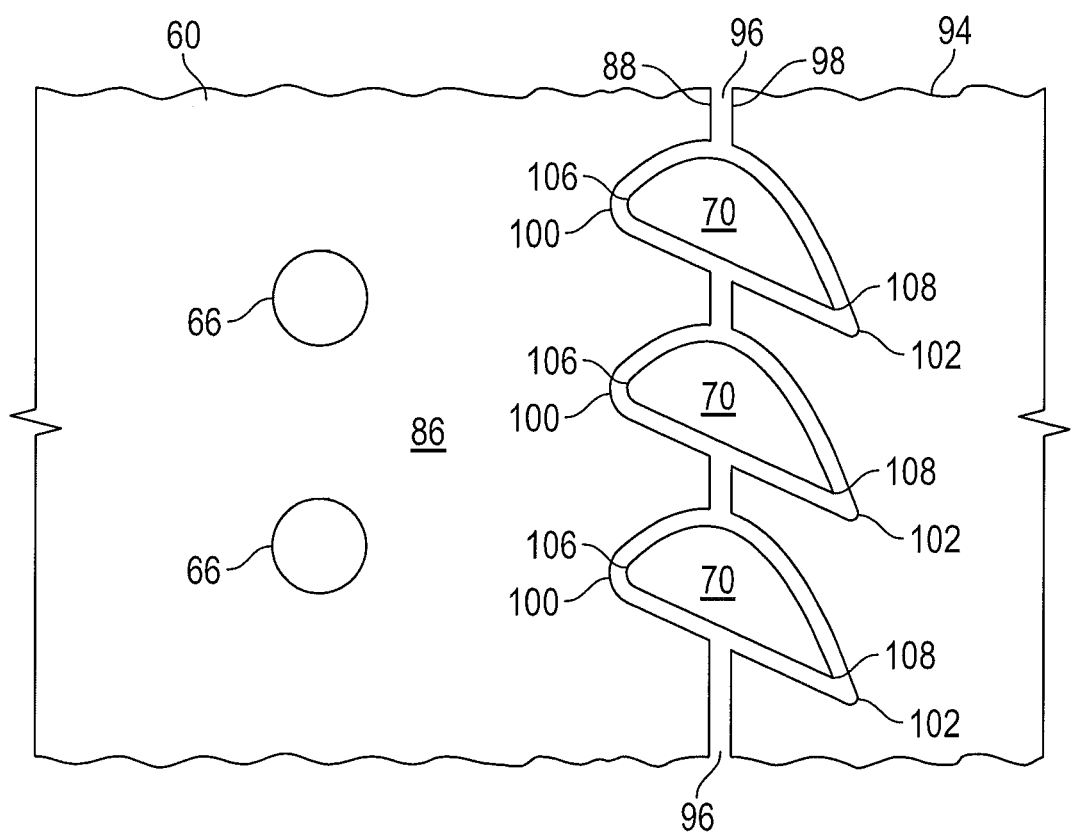
FIG. 3 is a partial plan view of a combustor and turbine portion of a gas turbine engine.
Figure 4:
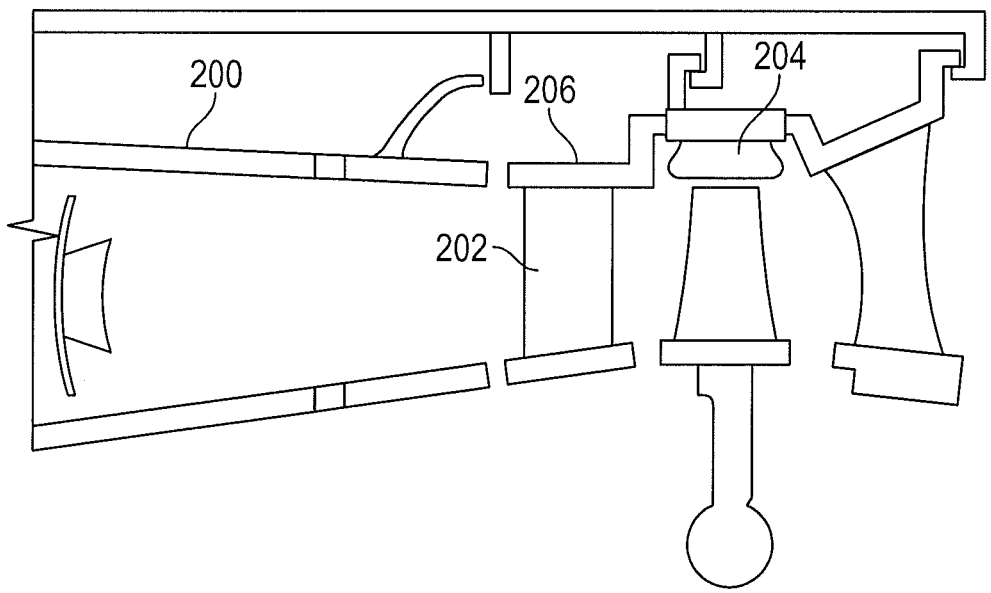
FIG. 4 is a partial cross-sectional view of a prior combustor and turbine arrangement.
Figure 5:
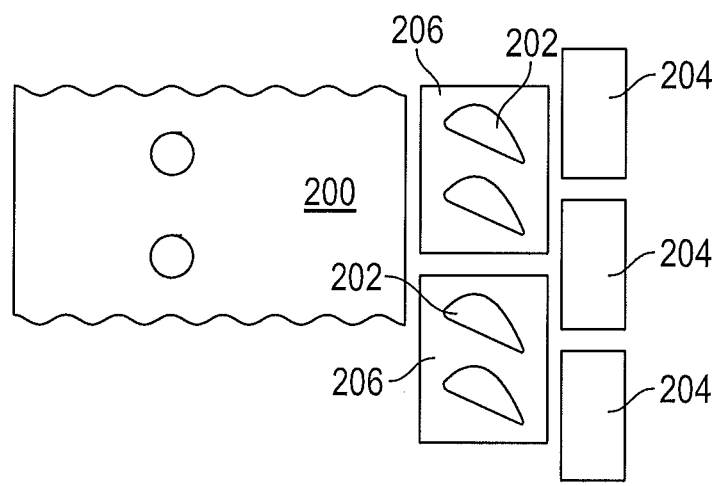
FIG. 5 is a partial plan view of a prior combustor and turbine arrangement.

Referring now to FIG. 3, the BOAS extension 94 extends forward along the plurality of first vanes 70 toward the liner end 88 defining a BOAS gap 96 between the liner end 88 and a BOAS end 98 of the BOAS extension 94. The BOAS gap 96 is located along the first vane 70 between a vane leading edge 106 and a vane trailing edge 108. In some embodiments, the platform gap 96 is located at mid-chord of the first vane 70.

In some embodiments, as shown in FIG. 3, the combustor liner extension 86 extends circumferentially across a plurality of first vanes 70, and may be a full, unsegmented, closed ring. Similarly, in some embodiments the BOAS extension 94 extends circumferentially across a plurality of first vanes 70, and may be a full, unsegmented, closed ring. Configuring the combustor liner extension and/or the BOAS extension 94 as a full, unsegmented, closed ring eliminates circumferential gaps in the arrangement, thereby reducing leakage.

To accommodate spanning across a plurality of first vanes 70, the combustor liner extension 86 includes a plurality of extension scallops 100 at the liner end 88. The extension scallops 100 are each contoured to accommodate a corresponding first vane 70 of the plurality of first vanes 70, and in one arrangement the airfoil portion of the corresponding first vane 70. Similarly, the BOAS extension 94 may include a plurality of platform scallops 102 at the BOAS end 98 to accommodate such first vane 70, and in one arrangement the airfoil portion of the first vane 70.

Utilizing the combustor liner extension 86 integral with the combustor liner 60 and the BOAS extension 94 integral to and extending from the BOAS 90 to define the vane outer platform 78 eliminates an axial gap present in a typical configuration, thereby reducing leakage and improving turbine performance. Further, placement of the BOAS gap 96 along the first vane 70 eliminates the gap in front of the first vane leading edges and the combustor interface. In prior configurations, a bow wake from the vane leading edges causes hot gas to penetrate the gap and thermally distorts and oxidizes the combustor support and vane forward platforms. This also happens in prior art for the aft gap between the vane training edge and BOAS. The configurations of the present disclosure eliminate both of these modes that can cause significant distress and limiting time on wing. Further, in embodiments where both the aft platform 94 and the combustor liner extension 86 are formed from CMC materials, or other similar materials, the use of sealing components between the aft platform 94 and the combustor liner extension 86 may be reduced, since their thermal expansion properties will be similar. Further, assembly part count is reduced, leading to reductions in cost and weight.

While the disclosure present herein relates to a first vane outer platform 78, one skilled in the art will readily appreciate that the present disclosure may similarly be applied to other turbine vane stages, such as a second vane 104, and may further be applied at, for example, the compressor section 24.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An assembly for a gas turbine engine, comprising:
   a vane assembly, comprising:
   an outer platform; and
   an airfoil section extending from the outer platform; and
   a first combustor panel extending at least partially along the vane assembly from upstream of the vane assembly; and
   a blade outer air seal extending at least partially along the vane assembly from downstream of the vane assembly;
   wherein the first combustor panel and the blade outer air seal define a platform gap located between a leading edge of the airfoil section of the vane assembly and a trailing edge of the airfoil section of the vane assembly;

wherein the vane assembly extends through the platform gap to a vane support disposed radially outboard of the first combustor panel and the blade outer air seal; and a vane seal is disposed at the vane assembly radially outboard of the blade outer air seal;

wherein the airfoil section is free at an inboard portion thereof.

2. The assembly of claim 1, further comprising one or more combustor panel scallops in the first combustor panel to accommodate the vane leading edge of the airfoil section of the vane assembly.

3. The assembly of claim 1, further comprising one or more blade outer air seal scallops in the blade outer air seal to accommodate the vane trailing edge of the airfoil section of the vane assembly.

4. The assembly of claim 1, wherein the first combustor panel is a full, unsegmented, closed ring.

5. The assembly of claim 1, wherein the blade outer air seal is a full, unsegmented, closed ring.

6. The assembly of claim 1, wherein the platform gap is located at mid-chord of the vane assembly.

7. The assembly of claim 1, wherein one or more of the first combustor panel and the blade outer air seal are formed from one of a ceramic matrix composite or monolithic composite material.

8. The assembly of claim 1, further comprising a second combustor panel extending radially inboard of the airfoil section and at least partially defining an inner platform.

9. The assembly of claim 1, wherein the vane assembly is a first turbine vane assembly.

10. A combustor panel of a gas turbine engine, comprising:

a main combustor panel portion disposed at a combustor of a gas turbine engine; and a combustor panel extension extending from the main combustor panel portion, the combustor panel extension including a recess therein corresponding to at least a portion of a cross-sectional shape of a downstream airfoil section of a vane assembly, the combustor panel extension configured such that the vane assembly is extendible through the recess; and a vane seal is disposed at the vane assembly radially outboard of a blade outer air seal;

wherein the airfoil section of the vane assembly is free at an inboard portion thereof.

11. The combustor panel of claim 10, wherein the recess is shaped to accommodate a vane leading edge of the downstream airfoil section.

12. The combustor panel of claim 10, wherein a combustor panel end is located at mid-chord of the downstream airfoil section.

13. The combustor panel of claim 10, wherein the combustor panel is a full, unsegmented, closed ring.

14. The combustor panel of claim 10, wherein the combustor panel is formed from one of a ceramic matrix composite or monolithic composite material.

15. A gas turbine engine assembly, comprising:

a combustor liner;

a blade outer air seal adjacent said combustor liner; and a vane assembly having at least one platform and an airfoil section extending from the platform;

wherein the airfoil section of the vane assembly extends through the combustor liner and the blade outer air seal and is secured to a vane support disposed radially outboard of the combustor liner and the blade outer air seal; and a vane seal is disposed at the vane assembly radially outboard of the blade outer air seal;

wherein the airfoil section of the vane assembly is free at an inboard portion thereof.

16. The gas turbine engine assembly of claim 15, wherein one or more of the combustor liner or the blade outer air seal is a full, unsegmented, closed ring.

17. The gas turbine engine assembly of claim 15, wherein the combustor liner and the blade outer air seal define a platform gap therebetween.

18. The gas turbine engine assembly of claim 17, wherein the platform gap is located at mid-chord of the airfoil section.

19. The gas turbine engine assembly of claim 15, wherein the combustor liner defines at least a portion of an inner platform of the vane assembly.

20. The gas turbine engine assembly of claim 15, wherein the combustor liner and the blade outer air seal are formed from one of a ceramic matrix composite or monolithic composite material.

* * * * *